United States Patent [19]

Rafanelli et al.

[11] Patent Number: 5,350,911
[45] Date of Patent: Sep. 27, 1994

[54] WAVEFRONT ERROR ESTIMATION DERIVED FROM OBSERVATION OF ARBITRARY UNKNOWN EXTENDED SCENES

[75] Inventors: Gerard L. Rafanelli, Fountain Valley, Calif.; Brent L. Ellerbroek, Albuquerque, N. Mex.; Susan B. Mount, Toorance; Mark J. Rehfield, Ranch Palos Verde, both of Calif.

[73] Assignee: Hughes Aircraft Company, Los Angeles, Calif.

[21] Appl. No.: 45,841

[22] Filed: Apr. 9, 1993

[51] Int. Cl.$^5$ .............................................. G01J 1/20
[52] U.S. Cl. ................................. 250/201.9; 356/121
[58] Field of Search .................. 250/201.9; 359/849; 356/121; 364/525, 148, 150

[56] References Cited

U.S. PATENT DOCUMENTS 5,128,530 7/1992 Ellerbroek et al. .............. 250/201.9
5,265,034 11/1993 Breckenridge et al. .......... 250/201.9

Primary Examiner—David C. Nelms
Assistant Examiner—K. Shami
Attorney, Agent, or Firm—Hugh P. Gortler; Michael W. Sales; W. K. Densow-Low

[57] ABSTRACT

An extended scene wavefront sensing apparatus and procedure that separates (deconvolves) scene effects from wavefront errors of an optical or similar system. The present wavefront sensing apparatus and procedure uses a point source wavefront slope sensor in scene scanning mode and estimates wavefront errors by using a cross-correlation or cross-coherence procedure that operates on the outputs of the point source wavefront slope sensor. A signal processing procedure employed by the point source wavefront slope sensor provides output signals corresponding to wavefront slopes at forward optics pupil locations geometrically projected to the location of the transmission and reflection measurement plane detector pairs. During the scanning process, each of the detector pairs (equivalent to a subaperture) measures the effects of the local unchanging wavefront error in the forward optical system and temporal variations due to the scanning scene. By cross correlating or cross-cohering each detector pair's temporal difference with differences from selected reference detector pairs, the scene induced variations in the measurement are eliminated, thereby leaving the stationary wavefront error component of the measurement. The lead/lag time in the temporal differences output between detector pairs and reference detector pairs are then used to estimate the wavefront slope differences between equivalent subapertures. The wavefront slope differences are used in a reconstructor to generate wavefront errors or wavefront slope errors, except for an unobservable global tilt.

12 Claims, 7 Drawing Sheets

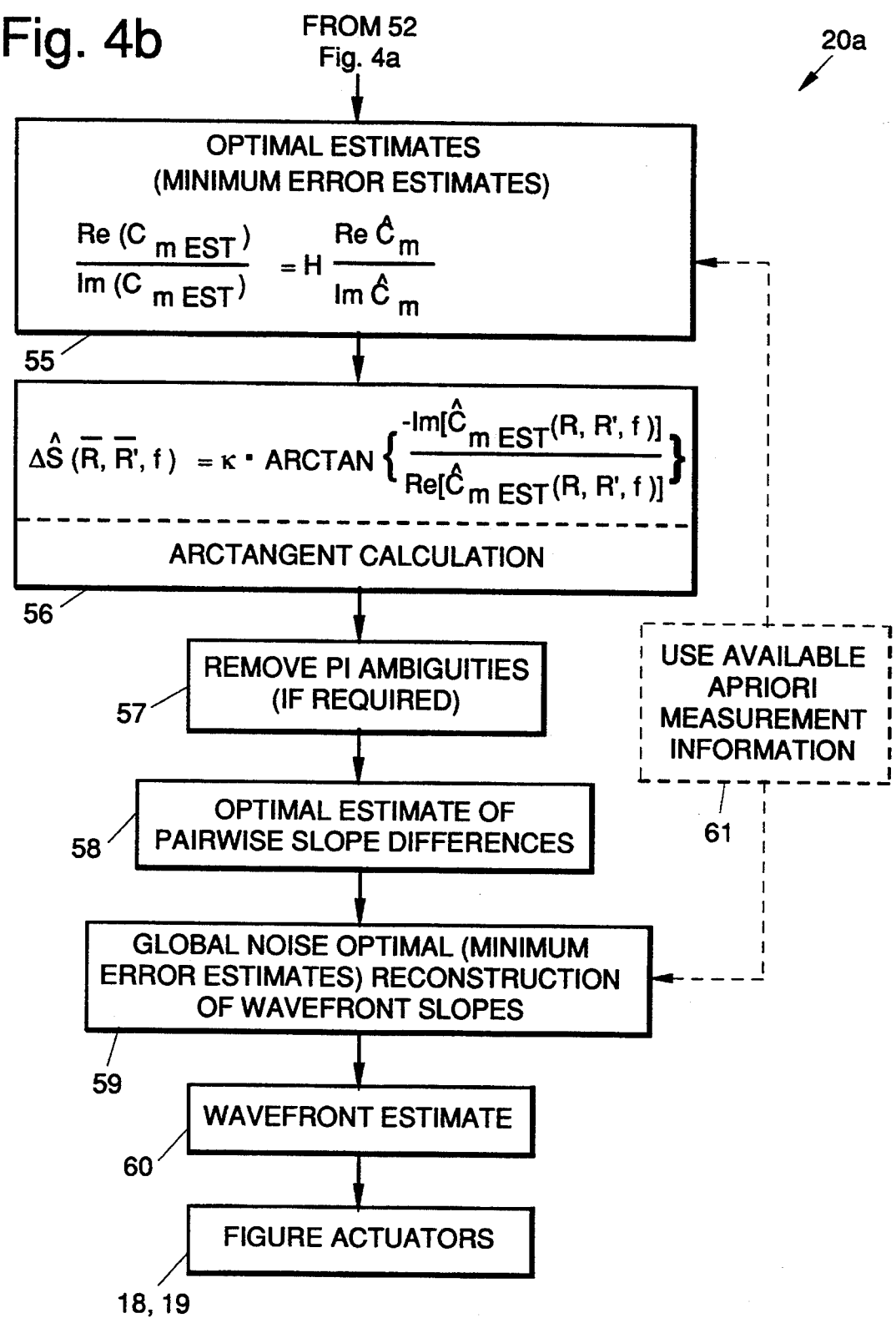

WAVEFRONT ERROR ESTIMATION DERIVED FROM OBSERVATION OF ARBITRARY UNKNOWN EXTENDED SCENES

BACKGROUND

The present invention generally relates to the alignment and control of active optical systems, and more particularly, to apparatus and methods for determining and correcting for optical system wavefront errors from observations of unknown extended scenes.

A wide variety of proposed large aperture, imaging optical systems utilize segmented and deformable optics technology in order to reduce optics fabrication costs and weight. Such systems require active sensing and control of segment alignment and surface profile errors to achieve diffraction-limited levels of image quality. Alignment and wavefront estimation concepts based directly upon optical system image quality are of interest to system designers to reduce the calibration accuracy and the long-term stability requirements of local sensing techniques.

To successfully provide high resolution imagery of distant extended scenes, relatively large aperture optical systems are required. The aperture diameters are on the order of several meters. In order to reduce fabrication costs and weight, as well as provide a means to package large optical systems into current space launch vehicles, for example, the optical elements, such as mirrors, may be fabricated as a number of segmented and deformable components. If the segments are perfectly aligned with each other and deformed to produce the correct segmented mirror surface, the total prescribed overall mirror surface is formed. Ideally, all of the mirror segments and surfaces should lie in a surface that satisfies the telescope's optical prescription. Each mirror segment is provided with actuators that are capable of controlling moving, and deforming the segment to align it with adjacent segments, and generate the corrected segmented mirror surfaces.

Large optical systems employing segmented and/or deformable optics require active sensing and control of alignment and surface figure errors to achieve diffraction limited image quality. While various approaches have been taken in the past to detect and correct alignment and surface figure errors, many do not involve direct full segment measurement of the optical system's performance, require optical element "dithering", or are highly sensitive to noise, or require apriori scene information.

The basic problem in determining segment alignment and mirror figure errors from observations of unknown extended scenes is the necessity to develop a measurement and processing procedure that separates the scene effects from the optical system's wavefront errors. One prior approach involves the active measurement of mirror errors by electro-mechanical measurement of the back surface distance variation. This approach has less than optimal performance since it provides for an indirect measurement of wavefront errors. Since the entire front surfaces of the segments (not the rear surfaces) provide the critical figure, electro-mechanical devices are subject to a variety of bias error sources.

Another approach that is quite common is the "multi-dither" technique, in which multiple images are recorded both before and after one or more adjustments ("dithers") to the various mirror actuators. The actual changes in the images resulting from the dithers are used to calculate the degree of wavefront error present. The implementation of "dithering" can produce complex opto-mechanical arrangements, increase the power and bandwidth required of the mirror's actuators, and may cause a time averaged degradation of image quality. Such a multi-dither technique is described in R. A. Muller and A. Buffington, *J.O.S.A.*, Vol. 64, No. 4, 1974, page 1200, and B. L. Ellerbroek, The Optical Science Corporation, Report No. Tr. 645,650, 1985. Because of the impact of multi-dither techniques on opto-mechanical complexity, actuator power and bandwidth requirements, and sensitivity to noise, the application of these techniques to optical systems with many degrees of freedom is questionable.

Another approach involves placing error sensing devices directly on an optical surface to be controlled. These include devices such as buried gratings, corner cubes and holographic optical elements. These devices are positioned to reflect light back to a focal plane sensor, with the location of the reflected spot providing information on the relative error associated with the location from which it was reflected. This approach suffers from limitations similar to the active electro-mechanical measurement technique, discussed above. In particular, surface error sensing devices require complex fabrication techniques, and do not sample the entire surface to be controlled.

It is therefore an objective of the present invention to provide a procedure whereby wavefront errors present in an optical system are determined from observations of extended scenes. It is a further objective of the present invention to provide a full aperture measurement and processing procedure that separates (deconvolves) scene effects from an optical system's wavefront errors.

SUMMARY OF THE INVENTION

The present invention is an extended scene wavefront sensing apparatus and procedure that separates (deconvolves) scene effects from an optical system's wavefront errors. The present extended scene wavefront sensing apparatus and procedure uses a point source wavefront slope sensor (U.S. Pat. No. 4,690,555) in a scene scanning mode and estimates wavefront errors by using a cross-coherence or cross-correlation procedure that operates on the outputs of the point source wavefront slope sensor.

A signal processing procedure employed by the point source wavefront slope sensor provides output signals corresponding to wavefront slopes at forward optics pupil locations geometrically projected to the location of the transmission and reflection measurement plane detector pairs. During the scanning process, each of the detector pairs of the point source wavefront slope sensor (each detector pair is equivalent to a subaperture) measures the effects of the local unchanging wavefront error in the forward optical system as well as temporal variations due to the scanning scene. By cross correlating each detector pair's temporal difference with selected reference detector pair differences, the scene induced variations in the measurement are eliminated, thereby leaving the stationary wavefront error component of the measurement. The lead/lag time in the temporal difference output between detector pairs and reference detector pairs are then used to estimate the wavefront slope difference between equivalent subapertures. The wavefront slope differences are then used to reconstruct the wavefront slope errors (except for an unobservable global tilt).

In a second embodiment of the invention the difference signals are Fourier transformed and cross-coherence signals are generated from the Fourier transformed signals. The phases of the cross-coherences between detector pairs and selected reference detector pairs are then used to estimate the wavefront slope differences between equivalent subapertures. An arctangent is computed on the cross-coherence signals and they are then optimally weighted and combined to provide the slope difference estimates. The wavefront slope may then reconstructed to produce the wavefront estimate used to correct the optical system.

In addition, the use of the wavefront slope sensor as defined in U.S. Pat. No. 4,690,555 in conjunction with the scene scanning cross-coherence (or cross-correlation) wavefront slope estimation procedure provides superior performance when compared to interferometric approaches. Interferometric wavefront estimation approaches use only a few spatial frequencies from an extended scene's signal, the superior performance of the sensing and estimation procedures described herein results from using all of the scene's spatial frequency signal.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 3a-3c show a pictorial interpretation of a cross-correlation wavefront sensing procedure in accordance with the principles of the present invention, wherein FIG. 3a depicts the temporal output of an ideal detector in the measurement plane of an equivalent solid state slope sensor subaperture as the scene scans by its field of view, and FIGS. 3b and 3c depict the difference output between ideal detectors located at same projected pupil location in the transmitted and reflected light paths of the slope sensor as the scene scans by each subaperture's field of view, without and with slope differences between the subapertures, respectively;

FIG. 4, comprising FIGS. 4a and 4b, shows a block diagram of a first iment of a cross-coherence wavefront sensing procedure and apparatus employed in the system of FIGS. 1, 1a or 1b.

DETAILED DESCRIPTION

Figure 1:
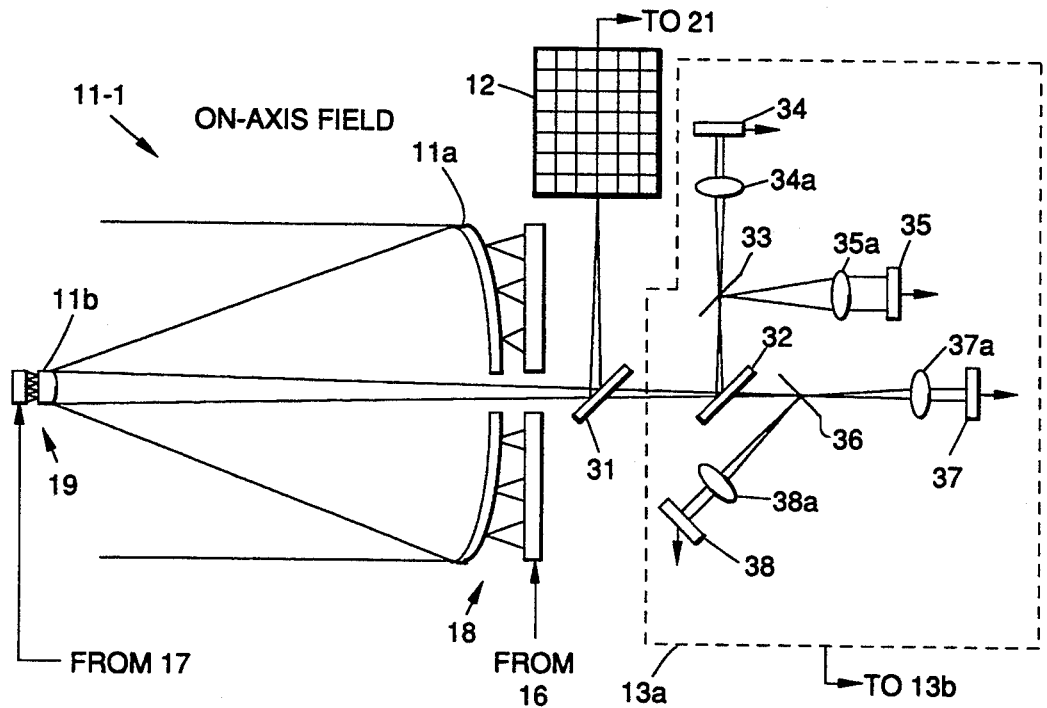
FIGS. 1, 1a and 1b depict potential optical system configurations that include means for determining and correcting optical system wavefront errors from observations of unknown extended scenes, and wherein the two optical system configurations correspond to placing the point source wavefront sensor either "on axis" in field, or "off axis" in field.
Figure 1A:
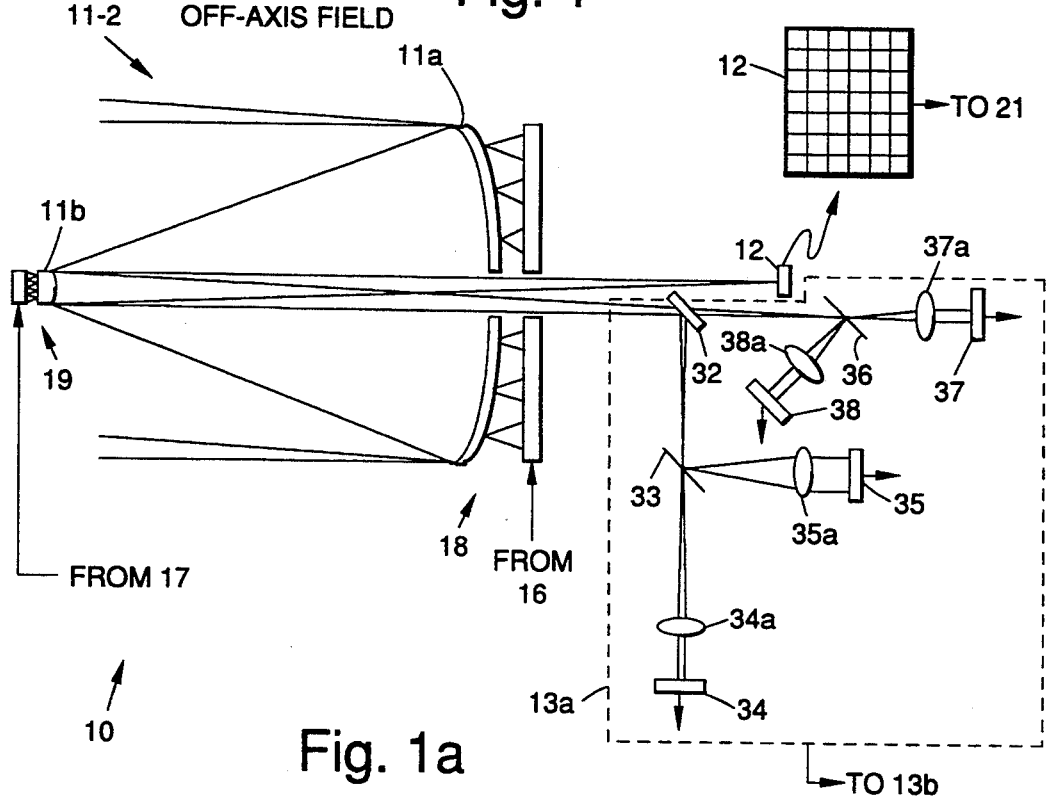
Figure 1B:
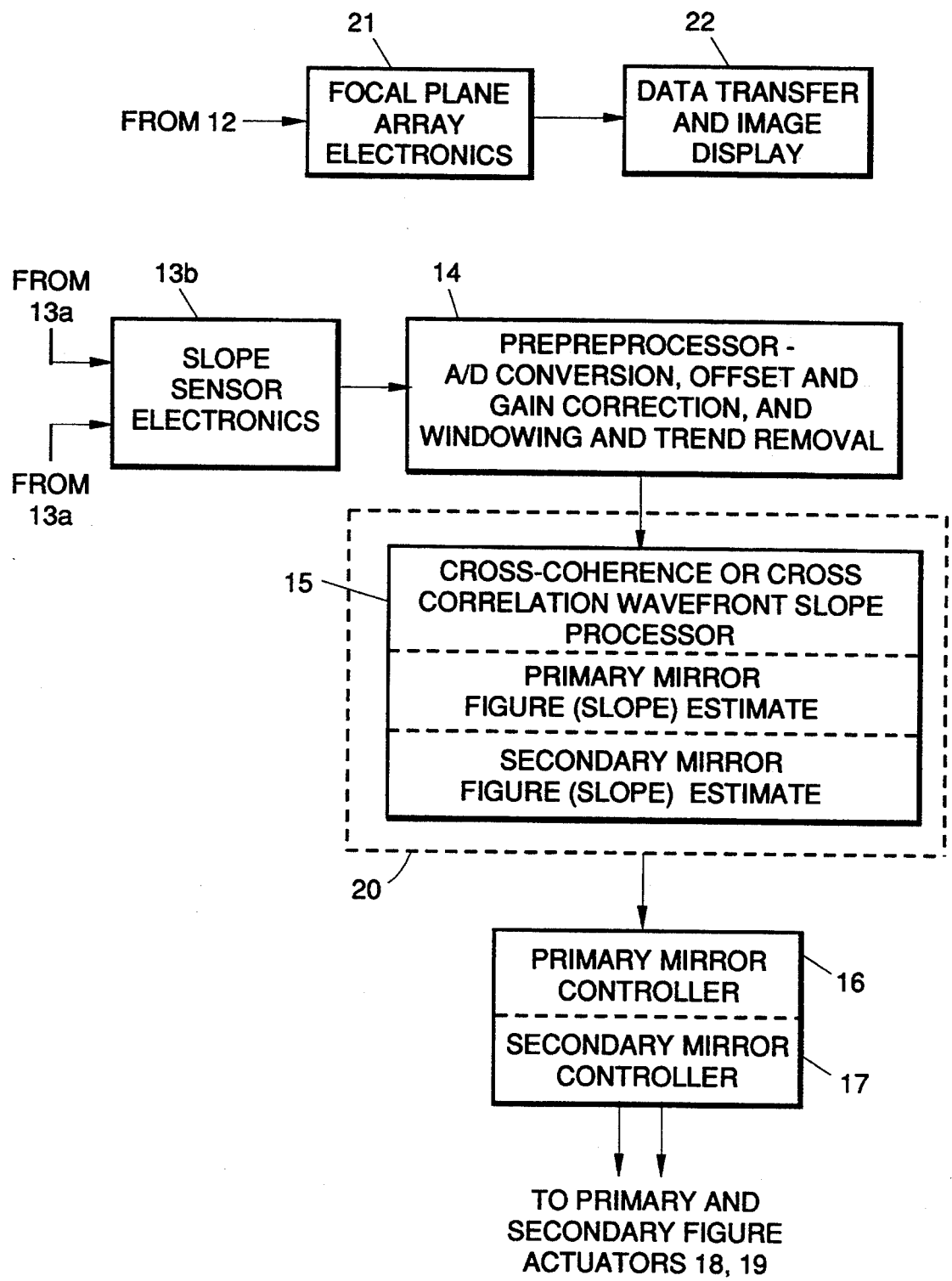
Figure 4A:
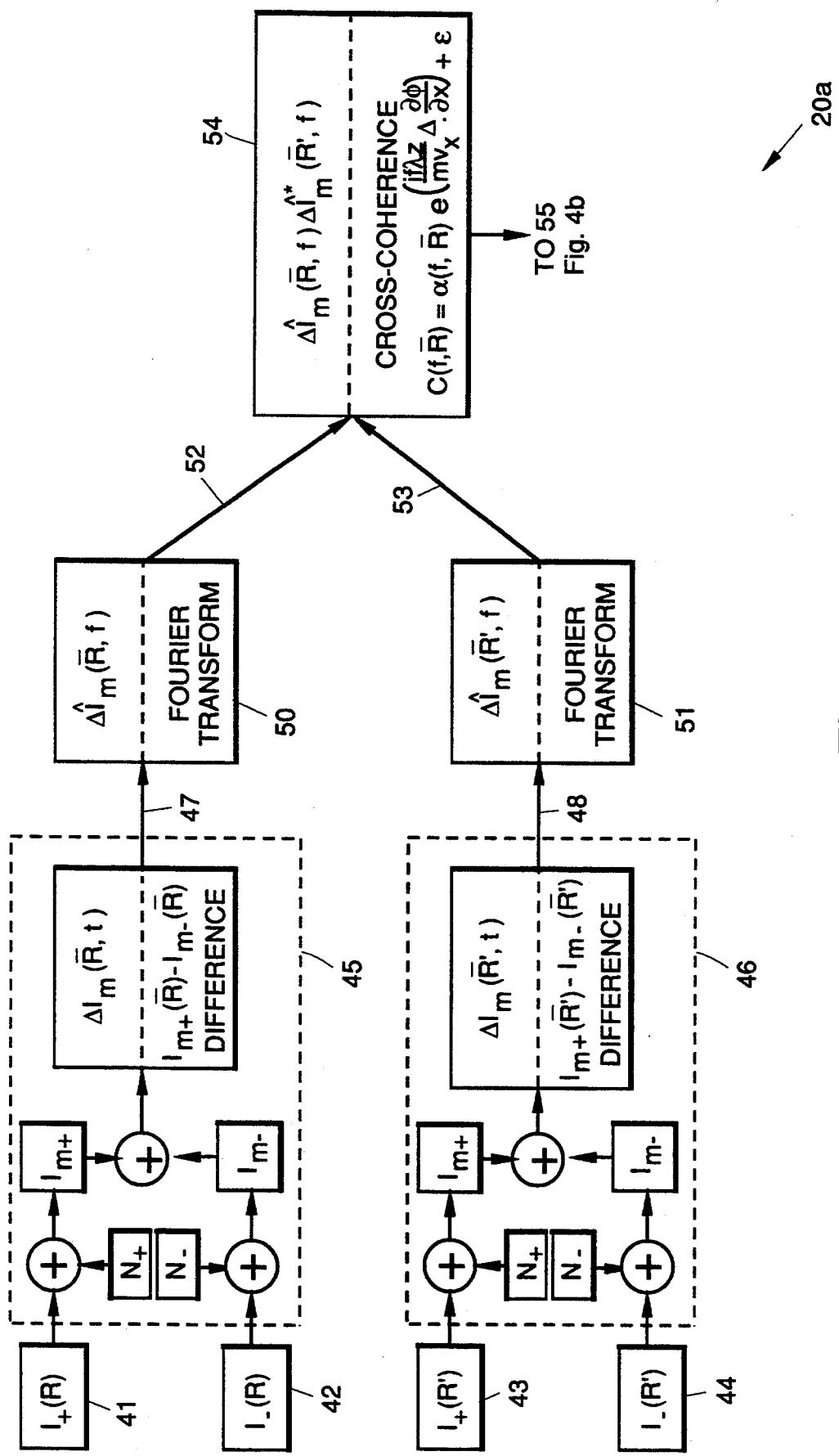
Figure 5:
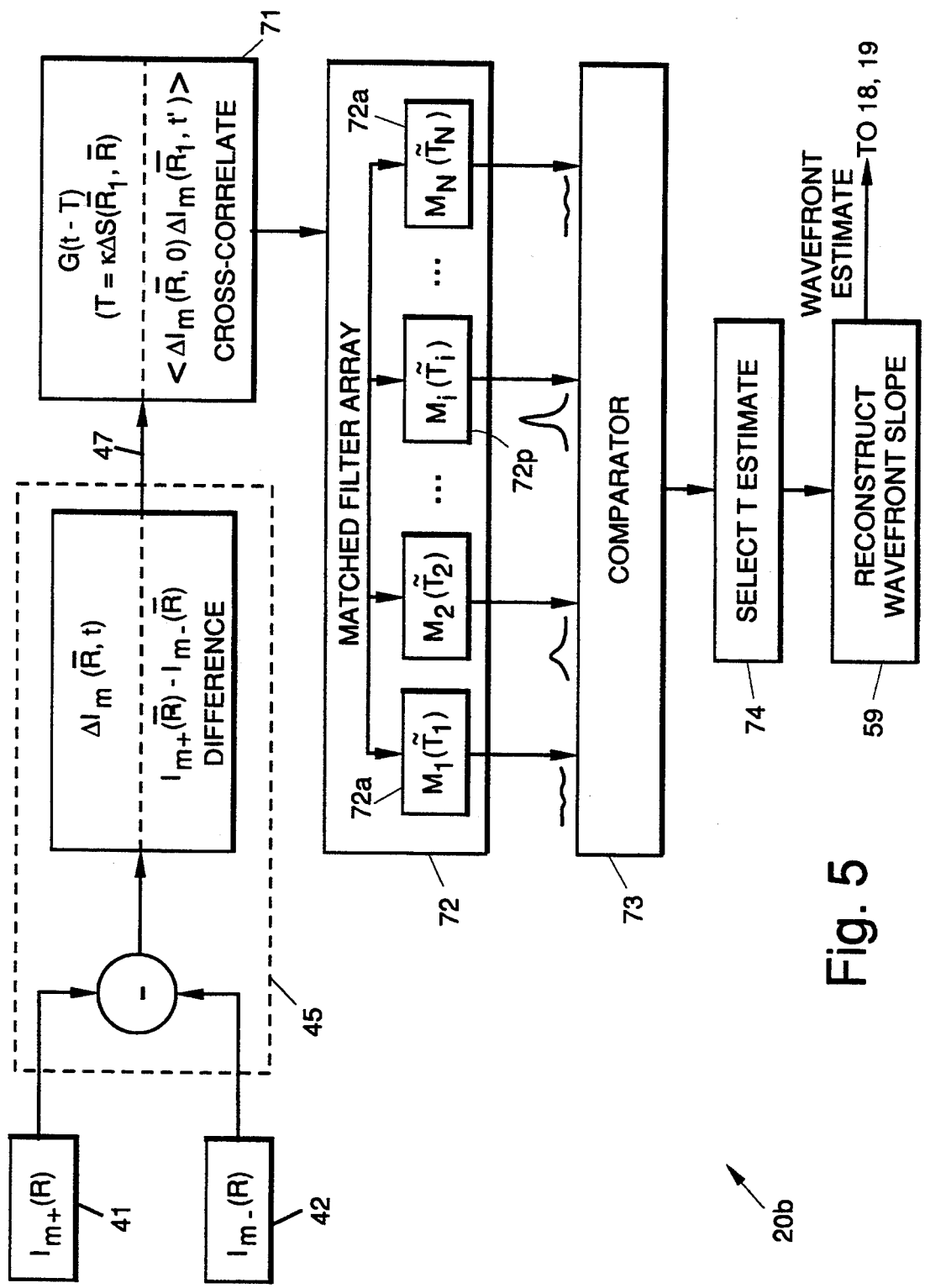
FIG. 5 shows a block diagram of a second embodiment of a cross-correlation wavefront sensing procedure and apparatus employed in the system of FIGS. 1, 1a or 1b.

By way of introduction, the basic problem in determining wavefront errors from the observation of unknown extended scenes is the need for a measurement and processing procedure that separates (deconvolves) scene effects from an optical system's wavefront errors. The present invention provides apparatus and a processing procedure that achieves this. Referring to FIGS. 1, 1a and 1b, an extended scene wavefront sensing optical system 10 in accordance with the principles of the present invention is shown. The optical system 10 uses a point source wavefront slope sensor 13, comprising slope sensor optics 13a and slope sensor electronics 13b, developed by the assignee of the present invention, in a scene scanning mode and estimates wavefront errors by using a cross-coherence or cross-correlation procedure 20 in accordance with the principles of the present invention. Specific embodiments of the cross-coherence (cross-correlation) procedure 20 are shown in FIGS. 4 and 5.

The sensor 13 is also referred to herein as a solid state slope sensor, or wavefront sensor 13. The wavefront sensor 13 is described in U.S. Pat. No. 4,690,555. A compact embodiment of the wavefront sensor 13 is described in U.S. Pat. No. 4,824,243. The use of the wavefront sensor 13 in the extended scene application enables the extended scene wavefront error estimation approach to be robust against scene spatial frequency dropout. In contrast, a conventional grating shearing approach suffers from spatial frequency scene dropout.

FIGS. 1 and 1a show two different configurations of the optical system 10. One configuration (11-1) places the point source wavefront sensor 13a "on axis" in field, by using an initial beamsplitter 31 that is adapted to reflect optical information to the focal plane array 12 and transmit optical information to the wavefront sensor 13. The second configuration (11-2) places the point source wavefront sensor 13a "off axis" in field and does not require the beamsplitter 31. The optical system 10 comprises a telescope 11 including a primary mirror 11a and secondary mirror 11b, that is used to scan an optical scene and to focus an image onto a detector array 12 and also onto a spatial filter of the wavefront sensor 13a. Notwithstanding the particular description disclosed herein, it is to be understood that the optical system 10, wavefront sensor 13, specifically illustrated configuration shown in FIGS. 1 and 1a, and any combination of the optical systems shown in FIGS. 1, 1a or 1b are not meant to limit the present invention to any one system configuration.

The wavefront sensor 13 is comprised of an initial beamsplitter 32. Light is reflected off of the beamsplitter 32 and is incident on a Y ramp filter 33. The Y ramp filter 33 splits the beam into a reflected and a transmitted beam varying in intensity as a function of Y position on the filter 33. The reflected light energy collected by a lens 35a and is incident on a first detector plane array 35. Light that is transmitted from the Y ramp filter 33 is collected by a lens 34a and is incident on a second detector plane array 34. Light that is transmitted through the beamsplitter 32 is incident on an X ramp filter 36.

The X ramp filter 36 splits the beam into a transmitted beam varying in intensity as a function of X position on the filter 36. The reflected light energy is collected by a lens 38a and is incident on a third detector plane array 38. Light that is transmitted from the X ramp filter 36 is collected by a lens 37a and is incident on a fourth detector plane array 37.

Slope sensor detector array electronics 13b sends the output from the detector plane arrays 34, 35, 37, 38 to a signal preprocessor 14. The signal preprocessor 14 provides for analog to digital conversion, offset and gain correction, windowing, and trend removal (if required). The output signals from the signal preprocessor 14 are sent to a wavefront slope estimation processor 15 that processes the data in accordance with the principles of the present invention. The wavefront slope estimation processor 15 produces primary mirror figure and secondary mirror figure error estimates that are coupled to primary and secondary mirror controllers 16, 17, respectively. The controllers 16, 17 command the primary and secondary mirror actuators 18, 19 to establish corrected mirror positions. Focal plane array (detector) electronics 21 coupled to the focal plane array 12 provides data that is transferred to an image display 22 that displays a post-wavefront-corrected image.

Although a mathematical formulation of the extended scene wavefront sensing procedure 20 of the present invention is cumbersome (specific embodiments are illustrated and described with reference to FIGS. 4 and 5), an intuitive appreciation of the procedure 20 is possible and is presented below. A signal processing procedure employed by the wavefront sensor 13 provides output signals corresponding to wavefront slopes at forward optics pupil locations geometrically projected to the location of transmission and reflection measurement plane detector pairs. During scanning, each of the detector pairs of the wavefront slope sensor 13, which are equivalent to subapertures, measures the effects of the local unchanging wavefront error in the optical system 10 as well as temporal variations caused by the scanning scene. By cross-correlating temporal differences of each detector pair with selected reference detector pair differences, scene induced variations in the measurement are eliminated, thereby leaving a stationary wavefront error component of the measurement. The lead/lag time in the temporal difference output between detector pairs and reference detector pairs is then used to estimate the wavefront slope difference between equivalent subapertures. The wavefront slope differences are then used to reconstruct the wavefront slope errors, except for an unobservable global tilt.

Figure 2:
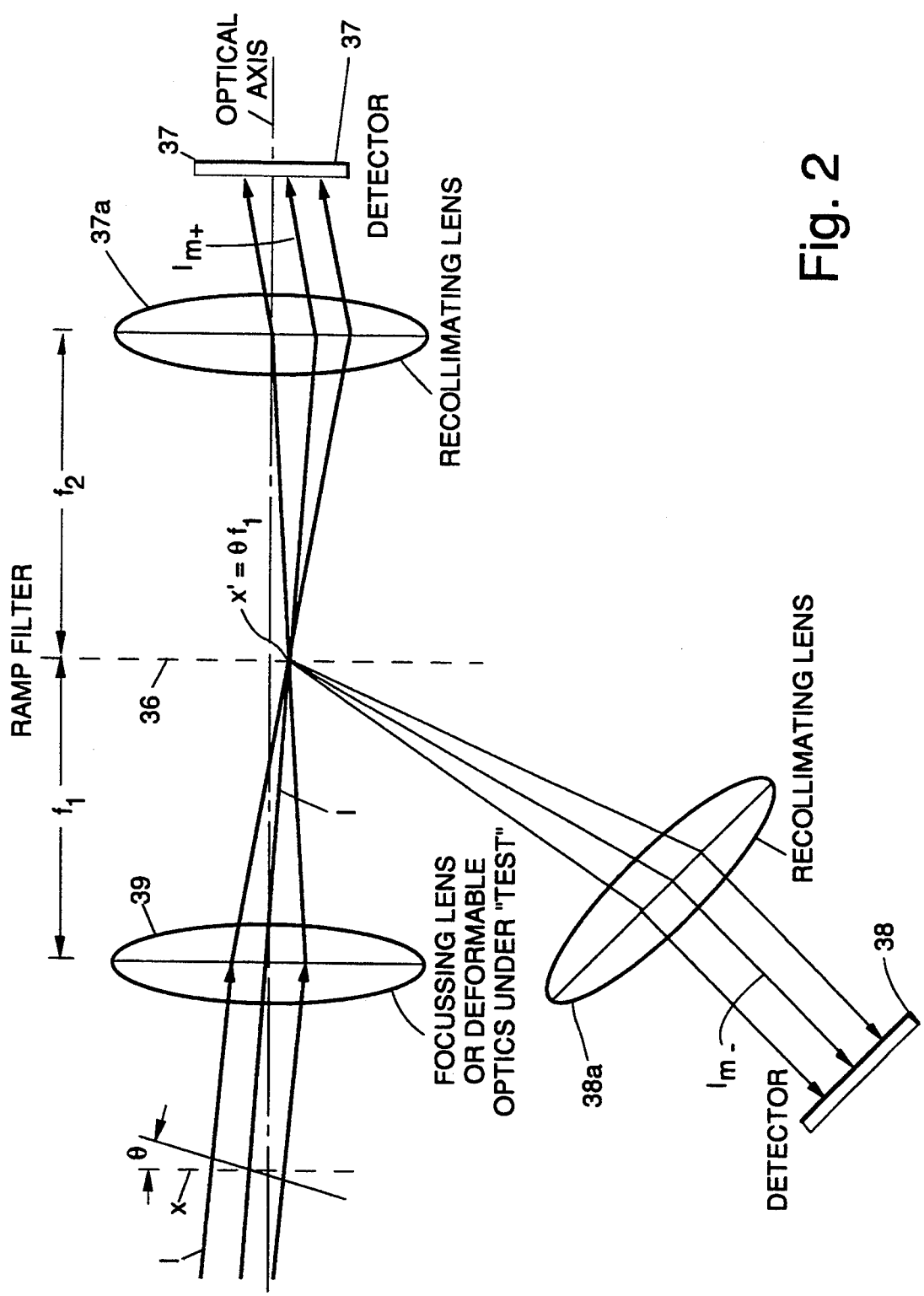
FIG. 2 shows a geometrical example for determining tilt error in one channel of a wavefront slope sensor of FIGS. 1, 1a or 1b while observing a point source.

As an example of the operation of the wavefront slope sensor 13, FIG. 2 depicts a simple geometrical model for determining tilt error in one channel of the wavefront sensor 13 while observing a point source. The model comprises a focussing lens 39, the ramp filter 36, two recollimating lenses 37a, 38a and two detector arrays 37, 38. It is to be understood that two optical arrangements shown in FIG. 2 are required in the wavefront slope sensor 13, one for horizontal and vertical directions as is depicted in FIGS. 1 and 1a. For a point source, $[I_{m+}(\bar{x}) - I_{m-}(\bar{x})]/[I_{m+}(\bar{x}) + I_{m-}(\bar{x})]$ is proportional to the gradient of the phase error, regardless of the type of phase error. The ± measurement plane detector locations for the wavefront slope sensor 13 correspond to geometrical projections of appropriately scaled subapertures located in the pupil of the forward optics.

Figure 3A:
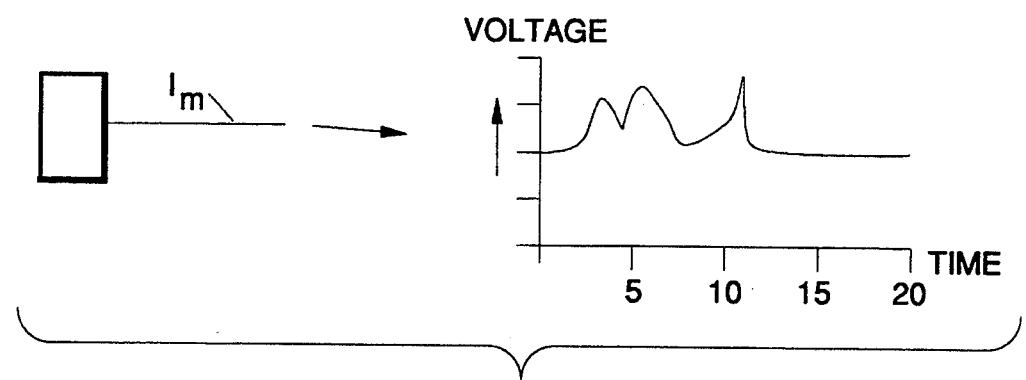
Figure 3B:
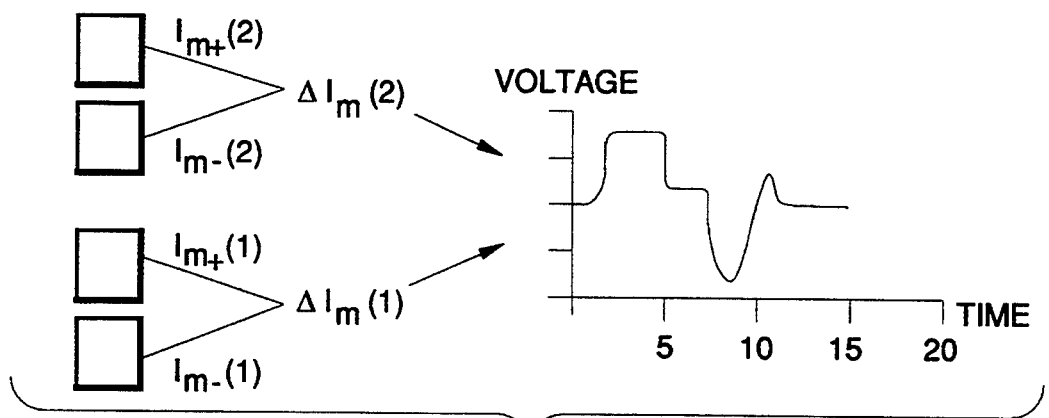
Figure 3C:
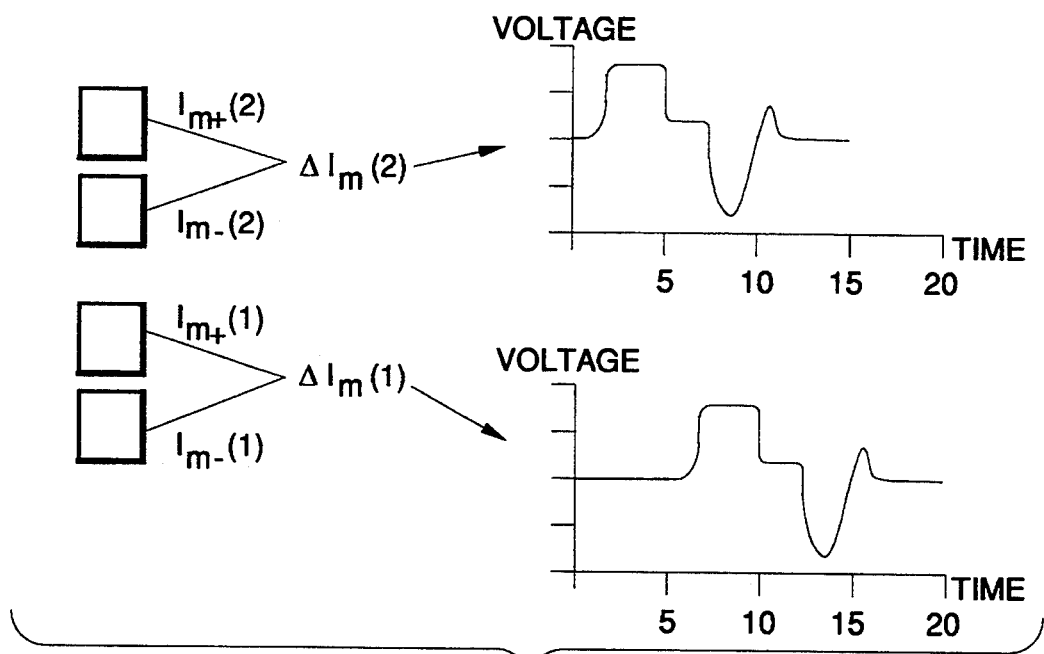

FIGS. 3a-3c show a pictorial interpretation of cross-correlation processing performed in the wavefront slope sensor 13 while observing unknown extended scenes. More particularly, FIGS. 3a-3c show a pictorial representation of the cross-correlation wavefront sensing procedure 20 in accordance with the principles of the present invention. FIG. 3a depicts the temporal output of an ideal detector in the measurement plane of a subaperture of the wavefront slope sensor 13 as the scene scans by its field of view. The remaining plots shown in FIGS. 3b and 3c depict the difference output between ideal detectors located at the same projected pupil locations in the transmission and reflection light paths of the wavefront slope sensor 13 as the scene scans by each subaperture's field of view, without and with slope differences between the subapertures, respectively. The signals shown in FIGS. 3b or 3c are processed by the procedure 20 of the present invention to estimate the wavefront errors and separate (deconvolve) scene effects from the wavefront errors.

Presented below is a description of the cross-correlation wavefront sensing procedure 20 and apparatus that determines system wavefront errors while observing incoherent extended scenes. The theoretical formulation of the performance of the procedure 20 provides a general basis for the direct comparison of various system configurations. Evaluation of the first order performance of the procedure 20 as a function of electronic signal to noise ratio, scene spatial frequency power spectral density parameters, and wavefront sensor optical configurations have been performed to verify potential system utility. The current performance predictions assume spatially homogeneous scene statistics, and point detectors.

FIG. 4 shows a block diagram of a first embodiment of a cross-coherence wavefront sensing procedure 20a and apparatus that may be employed in the optical system 10 of FIGS. 1, 1a and 1b. In this embodiment of the procedure 20a, measured intensity distributions 41, 43, 42, 44 for the transmitted intensity, $I_{m+}(\bar{R},t), I_{m+}(\bar{R}',t)$, and reflected intensity, $I_{m-}(\bar{R},t), I_{m-}(\bar{R}',t)$, respectively, are differenced 45, 46 to form difference signals 47, 48 $\Delta I_m(\bar{R},t), \Delta I_m(\bar{R}', t)$. Temporal Fourier transforms 50, 51 are performed on the differenced signals 47, 48 to produce Fourier transformed signals 52, 53, $\Delta\hat{I}_m(\bar{R}, f), \Delta\hat{I}_m(\bar{R}', f)$. A cross-coherence signal 54, $\Delta\hat{I}_m(\bar{R}, f) \Delta\hat{I}_m^*(\bar{R}', f)$, between each detector (subaperture) at location $\bar{R}'$, and a reference detector (subaperture) at location $\bar{R}$, is generated from the Fourier transformed signals 52, 53. The asterisk refers to performing a complex conjugate operation. Optimal and nonoptimal estimates 55 of the real and imaginary parts of the cross-coherence signal 54 are generated using available apriori measurement information 61, as appropriate. An arctangent computation 56 is made on the cross-coherence signal 54 to produce $$\Delta \hat{S}(\bar{R},\bar{R}',f) = \kappa \cdot \text{ARCTAN}\left( \frac{-Im[\hat{C}_{EST}(\bar{R},\bar{R}',f)]}{Re[\hat{C}_{EST}(\bar{R},\bar{R}',f)]} \right).$$

In the absence of noise, the dependence of the slope estimate on the scene spectrum vanishes. Optimal weighting 58 of the temporal frequency slope difference signals (estimate of pairwise slope difference signals) derived from the arctangent computation is performed to combine the many temporary frequency slope difference measurements into a single estimate for each pair, in accordance with the equation:

$$\Delta \hat{S}_{EST}(\bar{R}, \bar{R}') = A\Delta\hat{S}(\bar{R}, \bar{R}', f),$$

where the matrix A is the optimal estimator. Prior to the optimal combination of frequency components (optimal weighting 58), pi ($\pi$) ambiguities 57 may be removed, if required. The final array of output slope differences is processed by conventional wavefront reconstruction 59 using available apriori measurement information 61, if available, to produce a total wavefront or wavefront slope estimate 60. This wavefront estimate 60 is used to command the actuators 18, 19 to correct the mirror figures.

FIG. 5 shows a block diagram for a second embodiment of a cross-correlation wavefront sensing procedure 20b and apparatus of the present invention applied to one channel of the wavefront slope sensor 13 employed in the optical system 10 of FIG. 1. Relative wavefront slope difference signals 47 between pupil locations are estimated from a lead/lag time that maximizes an output of a matched filter array 72.

The measured intensity distributions 41, 42 for the transmitted intensity, $I_{m+}(R\overline{R}, t)$, and reflected intensity, $I_{m-}(\overline{R}, t)$, respectively, are differenced 45 to form a difference signal 47, $\Delta I_m(\overline{R}, t)$. A temporal cross-correlation 71, given by $<\Delta I_m(\overline{R}, t=0)\Delta I_m(\overline{R}_1,t)>$, between each detector (subaperture) at location $\overline{R}_1$, and a reference detector (subaperture) at location $\overline{R}$, is generated from the intensity differences. A temporal cross-correlation 43 is computed, and is a function of the lead/lag time associated with the wavefront slope difference between cross-correlated detectors. i.e., $$<\Delta I(\overline{R}, t=0)\Delta I(\overline{R}_1, t)> = G(\overline{R}, \overline{R}_1, t-T)$$

where the lead/lag time, T, is given by $$T = \kappa \Delta S(\overline{R}_1, \overline{R})$$

and $<\ldots>$ refers to ensemble averaging over scene statistics. $\kappa$ is a constant depending on optical system parameters, such as magnification, wavelength, and scan velocity. $S(\overline{R}_1\overline{R})$ is the difference between wavefront slopes at locations $\overline{R}_1$ and $\overline{R}$ in the measurement plane. $G(\overline{R}, \overline{R}_1, t)$, is a function of pupil geometry, scene spatial frequency power spectral density, and the filter function of the wavefront sensor 13.

Determination of the lead/lag time, T, and hence the wavefront slope difference, is accomplished by the matched filter array 72. Each matched filter 72a is designed to produce a peak when the input value, $T_{in}$ corresponds to its design value $\tilde{T}$. T is determined by comparing 73 the output of all of the matched filters 72a, and selecting 74 the value of T corresponding to a matched filter 72p with maximum peak output. For uncorrelated noise, this estimation procedure is known to be optimal in the sense of minimum mean square error. The final array of output slope differences is processed by conventional wavefront reconstruction 59 to produce a total wavefront or wavefront slope estimate that is applied to the actuators 18, 19.

Thus there has been described a new and improved apparatus methods for determining and correcting for optical system wavefront errors while observing extended incoherent scenes. It is to be understood that the above-described embodiment is merely illustrative of some of the many specific embodiments which represent applications of the principles of the present invention. Clearly, numerous and other arrangements can be readily devised by those skilled in the art without departing from the scope of the invention. For example, the present invention may be employed with other than optical wavelength bands, such as microwave bands, for example, with appropriate changes in the sensors.

What is claimed is:

1. A cross-correlation, extended scene, wavefront sensing method for use with an adaptive system for determining and correcting system wavefront errors from observation of unknown extended scenes, and wherein the adaptive system comprises a receiver, detection means coupled to the receiver, and processing means coupled to the detection means for producing signals that are adapted to correct for system wavefront errors, said wavefront sensing method comprising the steps of:

processing measured intensity distributions derived from signals received by the receiver and detection means to produce a spatially filtered transmitted intensity and a spatially filtered reflected intensity;

differencing the measured intensity distributions to form intensity difference signals;

generating a temporal cross-correlation, between each subaperture of the receiver and detection means and a reference subaperture from the intensity difference signals;

matched filtering the cross-correlated signals;

comparing the output of all of the matched filters and selecting the value of lead/lag time corresponding to the matched filter with maximum peak output to determine the wavefront slope difference; and reconstructing the wavefront slope differences to produce an error estimate that is adapted to correct for the system wavefront errors.

2. The cross-correlation, extended scene, wavefront sensing method of claim 1 wherein the step of reconstructing the wavefront slope differences produces a total wavefront slope error estimate that is adapted to correct for the system wavefront errors.

3. The cross-correlation, extended scene, wavefront sensing method of claim 1 wherein the step of reconstructing the wavefront slope differences produces a wavefront error estimate that is adapted to correct for the system wavefront errors.

4. A cross-correlation, extended scene, wavefront sensing method for use with an adaptive system for determining and correcting system wavefront errors from observations of extended scenes, and wherein the adaptive system comprises a receiver, detection means coupled to the receiver, and processing means coupled to the detection means for producing signals that are adapted to correct for system wavefront errors, said wavefront sensing method comprising the steps of:

processing measured intensity distributions derived from signals received by the receiver and detection means to produce a transmitted intensity, $I_{m+}(\overline{R}, t)$, and a reflected intensity, $I_{m-}(\overline{R}, t)$;

differencing the measured intensity distributions to form intensity difference signals $\Delta I_m(\overline{R}, t)$, and differencing the intensity distributions to form intensity difference signals $\Delta I_m(\overline{R}, t)$;

generating a temporal cross-correlation, $(\Delta I_m(\overline{R}, t)\Delta I_m^*(\overline{R}, t))$, between each subaperture at locations $\overline{R}$ on a projected pupil of the receiver, and a reference subaperture at locations $\overline{R}'$ on the antenna from the intensity difference signals, and wherein the temporal cross-correlation is a function of the lead/lag time associated with a wavefront slope difference between cross-correlated subapertures, as defined by the equation, $$<\Delta I(\overline{R}, t=0)\Delta I(\overline{R}',t)> = G(\overline{R}, \overline{R}', t-T)$$

where the lead/lag time, T, is given by $$T = \kappa \Delta S(\overline{R}, \overline{R}')$$

and where κ is a constant that is a function of predetermined parameters of the adaptive system, $S((\overline{R}, \overline{R}')$ is the difference between wavefront slopes at locations $\overline{R}'$ and $\overline{R}$ in a measurement plane, and $G(\overline{R}, \overline{R}', t)$, is a function of pupil geometry, scene spatial frequency power spectral density, and a wavefront sensor filter function;

matched filtering the cross-correlated signals;

comparing the output of all of the matched filters and selecting the value of lead/lag time corresponding to the matched filter with maximum peak output to determine the wavefront slope difference; and reconstructing the wavefront slope differences to produce an error estimate that is adapted to correct for the system wavefront errors.

5. The cross-correlation, extended scene, wavefront sensing method of claim 4 wherein the step of reconstructing the wavefront slope differences produces a total wavefront slope error estimate that is adapted to correct for the system wavefront errors.

6. The cross-correlation, extended scene, wavefront sensing method of claim 4 wherein the step of reconstructing the wavefront slope differences produces a wavefront error estimate that is adapted to correct for the system wavefront errors.

7. A cross-coherence, extended scene, wavefront sensing method for use with an adaptive system that corrects adaptive elements of a receiver of the system and measures and separates scene effects from system wavefront errors produced by the system, said wavefront sensing method comprising the steps of:

processing measured intensity distributions derived from signals received by the receiver to produce a spatially filtered transmitted intensity and a spatially filtered reflected intensity;

differencing the measured intensity distributions to form intensity difference signals;

performing a temporal Fourier transform on the differenced signals;

generating a cross-coherence signal, between each subaperture location and a reference subaperture location from the Fourier transformed signals;

generating optimal estimates (minimum error estimates) using the real and imaginary pans of the cross coherence signal;

computing an arctangent on the cross-coherence signal;

optimally estimating pairwise slope differences and weighting signals derived from the arctangent computation; and reconstructing the wavefront slope differences to produce an error estimate that is adapted to correct for the system wavefront errors.

8. The cross-coherence, extended scene, wavefront sensing method of claim 7 which further comprises the step of removing pi ambiguities after optimally estimating the pairwise slope differences.

9. A cross-coherence, extended scene, wavefront sensing method for use with an adaptive system that corrects individual elements of an receiver of the system and measures and separates scene effects from system wavefront errors produced by the system, said wavefront sensing method comprising the steps of:

processing measured intensity distributions derived from the receiver to produce a transmitted intensity, $I_{m+}(\overline{R}, t)$, and a reflected intensity, $I_{m-}(\overline{R}, t)$;

differencing the measured intensity distributions to form an intensity difference signal $\Delta I_m(\overline{R}, t)$;

performing a temporal Fourier transform on the differenced signals to produce $\Delta \hat{I}(\overline{R}, t)$; generating a cross-coherence signal, $\Delta \hat{I}(\overline{R}, f)\Delta \hat{I}^*(\overline{R}', f)$, between each subaperture at location $\overline{R}'$, and a reference subaperture at location $\overline{R}$, from the Fourier transformed signals;

generating minimum error estimates using the real and imaginary parts of the cross coherence signal;

computing an arctangent on the cross-coherence signal to produce $$\Delta \hat{S}(\overline{R}, \overline{R}_1, f) = \kappa \cdot ARCTAN \left\{ \frac{-Im[\Delta \hat{I}(\overline{R}, f)\Delta \hat{I}^*(\overline{R}', f)]}{Re[\Delta \hat{I}(\overline{R}, f)\Delta \hat{I}^*(\overline{R}', f)]} \right\};$$

optimally estimating pairwise slope differences and weighting the signals derived from the arctangent computation in accordance with the equation $$\Delta \hat{S}_{EST}(\overline{R}, \overline{R}') = A \Delta \hat{S}(\overline{R}, \overline{R}', f);$$ and reconstructing the wavefront slope differences to produce an error estimate that is adapted to correct for the system wavefront errors.

10. The cross-coherence, extended scene, wavefront sensing method of claim 9 which further comprises the step of removing pi ambiguities after optimally estimating the pairwise slope differences.

11. Apparatus for use with an adaptive system for determining correction signals required to correct for system wavefront errors from observations of extended scenes with a receiver and a detector array, said apparatus comprising:

means for processing measured intensity distributions derived from signals received by the receiver to produce a spatially filtered transmitted intensity and a spatially filtered reflected intensity;

means for differencing the measured intensity distributions to form intensity difference signals;

means for performing a temporal Fourier transform on the differenced signals;

means for generating a cross-coherence signal, between each subaperture location and a reference subaperture location from the Fourier transformed signals;

means for generating optimal estimates (minimum error estimates) using the real and imaginary parts of the cross coherence signal;

means for computing an arctangent on the cross-coherence signal;

means for optimally estimating all pairwise slope differences and weighting the signals derived from the arctangent computation;

means for removing pi ambiguities; and means for reconstructing the wavefront slope differences to produce an error estimate that is adapted to correct for the system wavefront errors.

12. Apparatus for use with an adaptive system that corrects individual elements of an antenna of the system and measures and separates scene effects from system wavefront errors produced by the system, said apparatus comprising:

means for processing measured intensity distributions derived from signals received by the receiver to produce a spatially filtered transmitted intensity and a spatially filtered reflected intensity;

means for differencing the measured intensity distributions to form intensity difference signals;

means for performing a temporal Fourier transform on the differenced signals;

means for generating a cross-coherence signal, between each subaperture location and a reference subaperture location from the Fourier transformed signals;

means for computing an arctangent on the cross-coherence signal;

means for optimally estimating all pairwise slope differences and weighting the signals derived from the arctangent computation;

means for removing pi ambiguities; and means for reconstructing the wavefront slope differences to produce an error estimate that is adapted to correct for the system wavefront errors.

* * * * *